US010505610B2

(12) United States Patent
He

(10) Patent No.: US 10,505,610 B2
(45) Date of Patent: Dec. 10, 2019

(54) BEAMFORMING METHOD AND BEAMFORMING APPARATUS

(71) Applicant: Xiaoxi He, Beijing (CN)

(72) Inventor: Xiaoxi He, Beijing (CN)

(*) Notice: Subject to any disclaimer, the term of this patent is extended or adjusted under 35 U.S.C. 154(b) by 279 days.

(21) Appl. No.: 15/697,412

(22) Filed: Sep. 6, 2017

(65) Prior Publication Data

US 2018/0131424 A1 May 10, 2018

Related U.S. Application Data

(63) Continuation of application No. PCT/CN2015/073798, filed on Mar. 6, 2015.

(51) Int. Cl.
*H04B 7/06* (2006.01)
*H01Q 3/28* (2006.01)
*H01Q 3/30* (2006.01)
*H04W 76/14* (2018.01)
*H01Q 3/36* (2006.01)

(52) U.S. Cl.
CPC .......... *H04B 7/0617* (2013.01); *H01Q 3/28* (2013.01); *H01Q 3/30* (2013.01); *H01Q 3/36* (2013.01); *H04B 7/0626* (2013.01); *H04W 76/14* (2018.02)

(58) Field of Classification Search
CPC ... H04W 76/14; H04B 7/0617; H04B 7/0639; H04B 7/0456; H04B 7/0417; H04B 7/0626; H04B 7/088; H01Q 3/28; H01Q 3/30; H01Q 3/00
See application file for complete search history.

(56) References Cited

U.S. PATENT DOCUMENTS

| 7,889,809 | B2* | 2/2011 | Im | H04B 1/711 |
| | | | | 375/267 |
| 2014/0314006 | A1* | 10/2014 | Suh | H04B 7/0452 |
| | | | | 370/329 |
| 2016/0277087 | A1* | 9/2016 | Jo | H04B 7/0617 |
| 2017/0033853 | A1* | 2/2017 | Kim | H04B 7/0417 |
| 2017/0078001 | A1* | 3/2017 | Kim | H04B 7/0626 |

* cited by examiner

*Primary Examiner* — Olumide Ajibade Akonai
(74) *Attorney, Agent, or Firm* — Flener IP & Business Law; Zareefa B. Flener

(57) ABSTRACT

A beamforming method includes: initializing data of array elements of an antenna array and calculating a current beam pattern based on the initialized data; calculating a difference value between the current beam pattern and a goal beam pattern, and determining data which makes the difference value minimum respectively for each array element using a numerical method in turn from the first array element to the last array element, with the data of other array elements being held and determined data replacing previous data; and generating a beamforming vector using the determined data and generating signals to be transmitted using the beamforming vector. A beamforming apparatus is also disclosed.

18 Claims, 12 Drawing Sheets

BEAMFORMING METHOD AND BEAMFORMING APPARATUS

CROSS-REFERENCE TO RELATED APPLICATIONS

The present application is a continuation of International Patent Application No. PCT/CN2015/073798 filed on Mar. 6, 2015, the contents of which are incorporated by reference herein in their entirety.

FIELD OF THE TECHNOLOGY

Aspects of the present invention relate to an antenna array system, and more particularly to a beamforming method and a beamforming apparatus.

BACKGROUND OF THE INVENTION

Antennas which are used to transmit and receive radio waves have been widely applied in systems such as telecommunications, Wireless Local Area Networks (WLANs), television broadcasting and radars, etc. Since a single antenna has many limits, for example it provides a low value of directivity, antenna arrays which each consists of more than one single antenna, i.e. antenna element, have been developed.

In an antenna array, by combining antenna elements in such a way that signals at particular angles experience constructive interference while others experience destructive interference, beamforming technique can achieve good spatial selectivity, and thus has been rapidly developed in rent decades.

In order to implement beamforming, many methods, such as Convex Optimization, Orthogonal Method and metaheuristic methods, have been proposed. Among these beamforming methods, Convex Optimization can realize an optimism object of maximizing sidelobe attenuation and minimizing mainlobe ripple, but cannot be applied to realize an optimism object of matching a given beam pattern. In contrast, Orthogonal Method can be used to realize the beam pattern matching problem in some cases, for example in case that the object beam pattern can be perfectly reached. But if the object beam pattern cannot be exactly reached, for example, it is just an object which can be approached rather than being reached, or if the optimism object is to maximizing sidelobe attenuation and minimizing mainlobe ripple, Orthogonal Method is unable to provide a satisfactory result. That is, none of Convex Optimization and Orthogonal Method has a wide range of use.

As another kind of beamforming methods, metaheuristic methods include Genetic Algorithms (GA), Differential Evolution Algorithm (DEA), and Particle Swarm Optimization (PSO) and so on. Although metaheuristic methods can realize both of the above-mentioned optimism objects and thus have a wide range of use, they have a very low computing speed, which makes them not practical in the field of antenna arrays.

Accordingly, there is a need to develop a beamforming method and a beamforming apparatus which not only have a wide range of use but also have a fast computing speed.

SUMMARY OF THE INVENTION

Aspects of the present invention are directed toward a beamforming method which has both of a wide range of use and a fast computing speed.

Additional aspects of the present invention are directed toward a beamforming apparatus which has both of a wide range of use and a fast computing speed.

According to aspects of the present invention, a beamforming method includes:

initializing data of array elements of an antenna array and calculating a current beam pattern based on the initialized data;

calculating a difference value between the current beam pattern and a goal beam pattern, and determining data which makes the difference value minimum respectively for each array element using a numerical method in turn from the first array element to the last array element, with the data of other array elements being held and determined data replacing previous data; and generating a beamforming vector using the determined data and generating signals to be transmitted using the beamforming vector.

In one embodiment, the beamforming method further comprises repeating the step of determining data until a difference between the current difference value and the previous difference value is less than a preset threshold.

In another embodiment, the beamforming method further comprises establishing a goal beam pattern based on an optimism object if the optimism object does not include the goal beam pattern.

According to additional aspects of the present invention, a beamforming apparatus includes:

an input receiving unit configured to receive a goal beam pattern;

a data initializing unit configured to initialize data of array elements of an antenna array pattern and calculate a current beam pattern based on the initialized data;

a data calculation unit configured to calculate a difference value between the current beam pattern output from the data initializing unit and the goal beam pattern output from the input receiving unit, and determine data which makes the difference value minimum respectively for each array element using a numerical method in turn from the first array element to the last array element, with the data of other array elements being held and determined data replacing previous data;

a beamforming vector generating unit configured to generate a beamforming vector using the determined data sent from the data calculation unit; and a signal generating unit configured to generate signals to be transmitted using the beamforming vector sent from the beamforming vector generating unit.

In one embodiment, the beamforming apparatus further comprises a threshold presetting unit configured to preset a threshold, and the data calculation unit is further configured to repeat the step of determining data until a difference between the current difference value and the previous difference value is less than the preset threshold output from the threshold presetting unit.

In another embodiment, the input receiving unit is further configured to establish a goal beam pattern based on an optimism object if the optimism object does not include the goal beam pattern.

With the beamforming method and the beamforming apparatus described above, since a goal beam pattern is determined at first, it can realize the optimism object of beam pattern matching if the goal beam pattern can be reached. Even if the goal beam pattern cannot be reached and can only be approached, since iteration methods are used in an embodiment, rather than direct computation like in Orthogonal Method, a good result can also be provided. Thus compared with Orthogonal Method, it has a wide range of use.

Further, in another embodiment, the optimism object of maximizing sidelobe attenuation and minimizing mainlobe ripple can be transformed to a goal beam pattern, and thus can be realized. Therefore, compared with Convex Optimization and Orthogonal Method which each can only realize limited optimism objects, a wide range of use can be provided.

Meanwhile, since a certain kind of numeric method is used to calculate the difference value, compared with meta-heuristic methods in which a large number of random attempts are based, this beamforming method and apparatus provide a much faster computing speed, and thus are practical for actual implementation.

BRIEF DESCRIPTION OF THE DRAWINGS

The above and other aspects of the present invention will become more apparent from the following detailed description when taken in conjunction with the accompanying drawings in which.

DETAILED DESCRIPTION OF THE INVENTION

In the following detailed description, embodiments will be described with reference to the accompanying drawings. However, the present invention may be embodied in various different forms, and should not be construed as being limited only to the illustrated embodiments. Rather, these embodiments are provided as examples, simply by way of illustrating the concept of the present invention to those skilled in the art. Accordingly, processes, elements, and techniques that should be apparent to those of ordinary skill in the art are not described herein.

Figure 1:
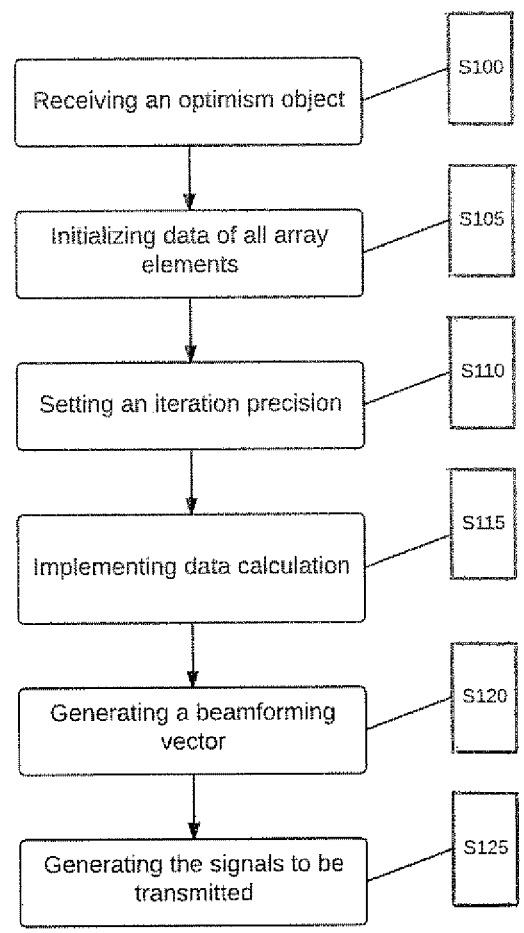
FIG. 1 is a flowchart illustrating a beamforming method according to an embodiment of the present invention.
Figure 2:
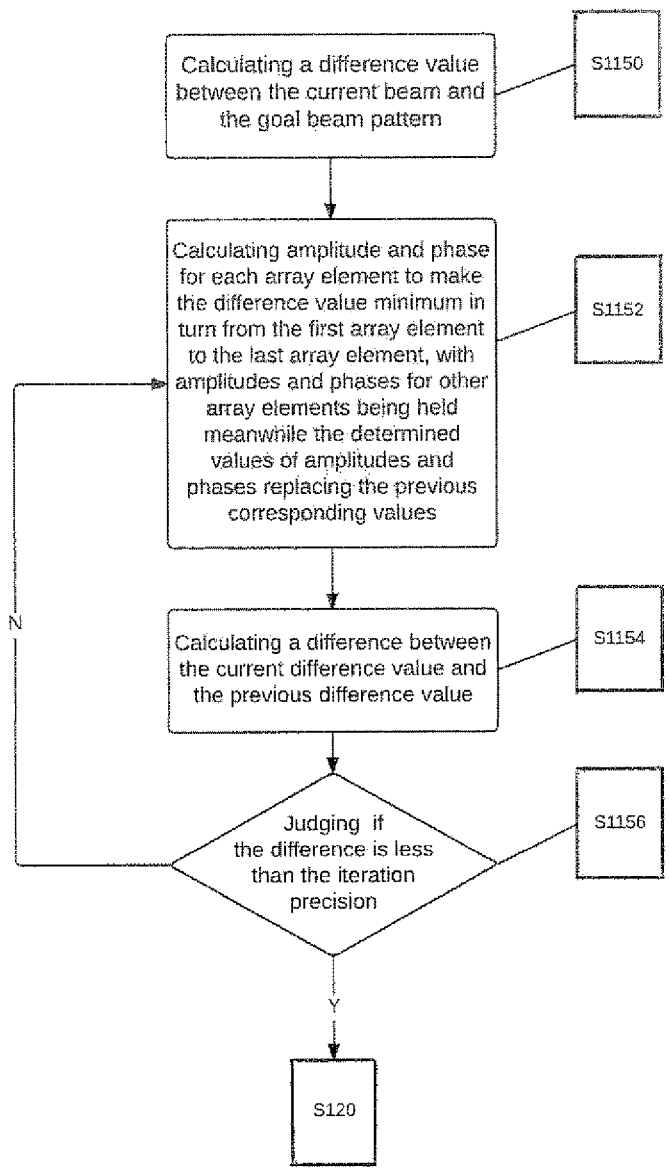
FIG. 2 is a detailed flowchart illustrating steps of data calculation of FIG. 1.

FIG. 1 is a flowchart illustrating a beamforming method according to an embodiment of the present invention, and FIG. 2 is a detailed flowchart illustrating steps of data calculation of FIG. 1.

Referring to FIG. 1, a beamforming method according to an embodiment of the present invention will be described hereinafter.

At step S100, an optimism object input by a user is received. If it is determined that there is no given goal beam pattern included in the optimism object, a goal beam pattern can be further established based on the optimism object.

For example, for the optimism object of beam pattern matching, a goal beam pattern will be included in the optimism object directly. And for the optimism object of maximizing sidelobe attenuation and minimizing mainlobe ripple, there will be no goal beam pattern. In such a case, a step of establishing a goal beam pattern based on the optimism object will be further implemented. The detailed description of this step will be omitted since it is well known for those skilled in the art.

In an embodiment, the goal beam pattern can be indicated as $S(\theta)$, wherein $\theta$ indicates direction angle.

At step S105, the data of all array elements are initialized, and then a current beam pattern which can be indicated as $G(\theta)$ is calculated based on the initialized data. For example, amplitude w of each array element is initialized as 1 which is the largest amplitude while 0 is the smallest one, and phase $\varphi$ of each array element is initialized as 0.

Then, at step S110, a threshold, for example, an iteration precision which can be indicated as $\varepsilon$, is preset based on the user's requirement of speed and accuracy for the optimization processes.

Hereinafter data calculation implemented at step S115 will be described with reference to FIG. 2, assuming there are n array elements.

At step S1150, a difference value, which can be indicated as f, between the current beam pattern $G(\theta)$ and the goal beam pattern $S(\theta)$ is calculated. In an embodiment, the difference value can be calculated using the equation of $f(w,\phi)=\int_0^\pi (G(\theta)-S(\theta))^2 \cdot d\theta$. Alternatively, equation of $$f(w, \phi) = \frac{\sqrt{\int_0^\pi G(\theta)^2 \cdot d\theta \cdot \int_0^\pi S(\theta)^2 \cdot d\theta}}{\int_0^\pi G(\theta) \cdot S(\theta) \cdot d\theta}$$

can be used. Here, $f(w,\phi)$ indicates the difference value, $w=(w_1, w_2, \ldots, w_n)$ indicates the amplitudes of the n array elements, and $\phi=(\phi_1, \phi_2, \ldots, \phi_n)$ indicates phases of the n array elements. However, the present invention is not limited thereto. Instead, other calculation methods based on integrals with respect to $\theta$ can be used provided that it can indicate the difference between the current beam pattern $G(\theta)$ and the goal beam pattern $S(\theta)$.

At step S1152, amplitude $w_i$ and phase $\varphi_i$ for each array element are calculated to make the difference value f minimum in turn from the first array element to the nth array element, with the data of other array elements being held and determined data replacing previous data. That is, values of amplitudes and phases for other array elements are held, and the determined values of amplitudes and phases replacing the previous corresponding values.

For example, when the calculation is implemented for the first array element, values of amplitudes and phases for the second to the nth array elements are held. And if this is the first time to implement the step, values of amplitudes and phases for the second to the nth array elements will be 1 and 0 respectively. If this is the second or third time to implement the step, values of amplitudes and phases for the second to the nth array elements will be $w_2$-$w_n$ and $\varphi_2$-$\varphi_n$ which are determined in the last implementation of the step respectively.

As another example, when the calculation is implemented for the second array element, values of amplitudes and phases for the first and the third to the nth array elements are held. And if this is the first time to implement the step, values of amplitude and phase for the first array element will be determined $w_1$ and $\varphi_1$ respectively, while values of amplitudes and phases for the third to the nth array elements will be 1 and 0 respectively. If this is the second or third time to implement the step, values of amplitude and phase for the first array element will be $w_1$ and $\varphi_1$ determined in this implementation of the step, while values of amplitudes and phases for the third to the nth array elements will be $w_3$-$w_n$ and $\varphi_3$-$\varphi_n$ which are determined in the last implementation of the step respectively.

As still another example, when the calculation is implemented for the nth array element, values of amplitudes and phases for the first to the (n−1)th array elements are held, and values of amplitudes and phases for the first to the (n−1)th array element will be $w_1$-$w_{n-1}$ and $\varphi_1$-$\varphi_{n-1}$ determined in this implementation of the step respectively.

Any of the existing numerical methods, such as Conjugate Gradient Method, Gradient Descent Method, Newton's Method etc., can be used to calculate the amplitude and the phase for each array element, and detailed description thereof will be omitted since it is well known for those skilled in the art.

At step S1154, a difference between the current difference value f and the previous difference value f is calculated. Here, the current difference value f means the difference value f after this implementation of step S1152, while the previous difference value f means the difference value f before this implementation of step S1152, for example the value determined at step S1150 or the value determined after the last implementation of step S1152.

At step S1156, it is judged if the calculated difference is less than the iteration precision ε. If so, step S120 which will be described later will be implemented. Otherwise, step S1152 will be implemented again for all of the n array elements.

It will be understood that steps S1154 and S1156 as well as S110 may be omitted in some cases to simplify the processing and provide a faster computing speed.

Referring back to FIG. 1, at step S120, the data of the current $w_1$-$w_n$ and $\varphi_1$-$\varphi_n$ are used to generate a beamforming vector. For example, the amplitude of each array element will be $w_1$-$w_n$ respectively, and the phase of each array element will be $\varphi_1$-$\varphi_n$ respectively.

Finally, at step S125, the signals to be transmitted through an antenna array are generated using the beamforming vector.

With this beamforming method, since a goal beam pattern is determined at first, it can realize the optimism object of beam pattern matching if the goal beam pattern can be reached. Even if the goal beam pattern cannot be reached and can only be approached, since iteration methods are used in an embodiment, rather than direct computation like in Orthogonal Method, this beamforming method can also provide a good result. Thus compared with Orthogonal Method, it has a wide range of use.

Further, in another embodiment, the optimism object of maximizing sidelobe attenuation and minimizing mainlobe ripple can be transformed to a goal beam pattern, and thus can be realized. Therefore, compared with Convex Optimization and Orthogonal Method which each can only realize limited optimism objects, a wide range of use can be provided.

Meanwhile, since a certain kind of numeric method is used to calculate the difference value, compared with meta-heuristic methods in which a large number of random attempts are based, this beamforming method provides a much faster computing speed, and thus is practical for actual implementation.

Figure 3:
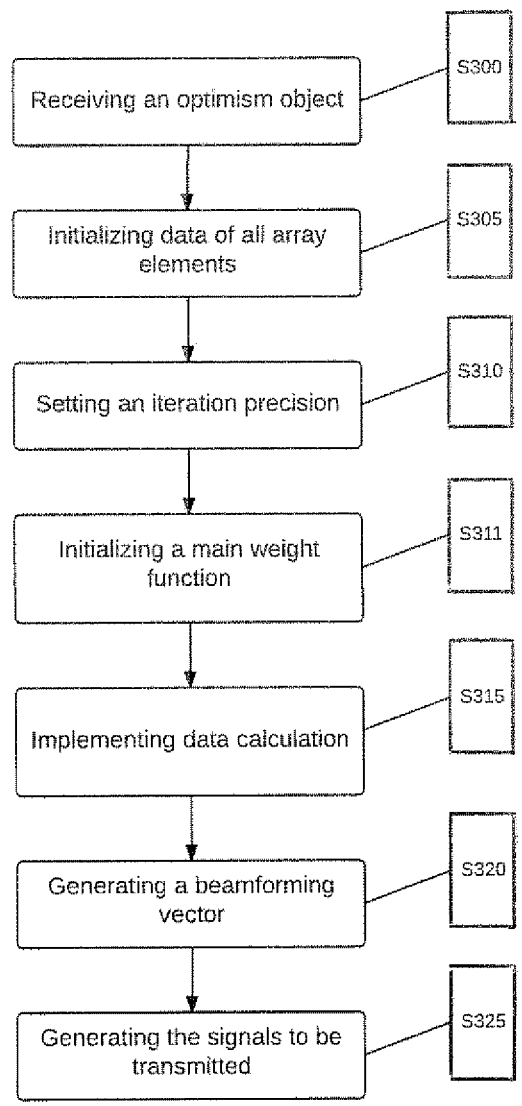
FIG. 3 is a flowchart illustrating a beamforming method according to another embodiment of the present invention.
Figure 4:
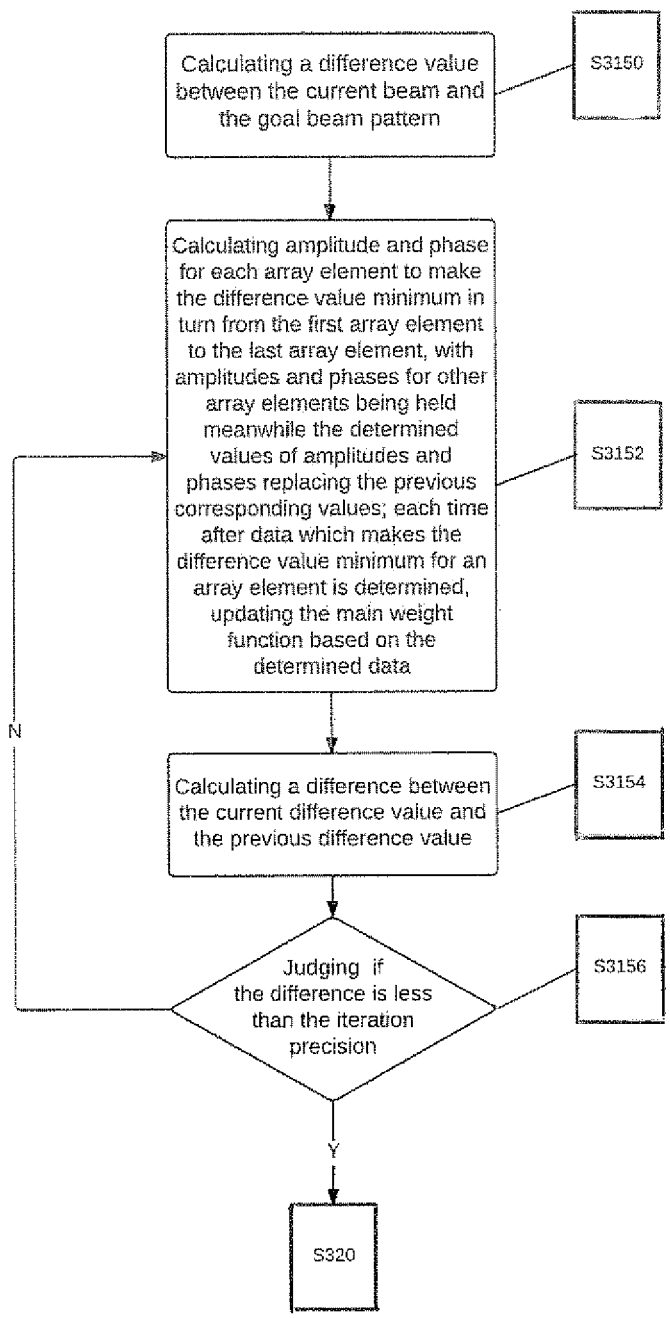
FIG. 4 is a detailed flowchart illustrating steps of data calculation of FIG. 3.

FIG. 3 is a flowchart illustrating a beamforming method according to another embodiment of the present invention, and FIG. 4 is a detailed flowchart illustrating steps of data calculation of FIG. 3.

Referring to FIG. 3, a beamforming method according to this embodiment will be described hereinafter, wherein steps S300 to S310 are similar to steps S100 to S110 of FIG. 1 and detailed description thereof will be omitted.

At step S311, a main weight function which can be indicated as $P_1(\theta)$ is initialized. For example, $P_1(\theta)$ can be initialized as $$\frac{1}{G(\theta)} \text{ or } \frac{|G(\theta) - S(\theta)|}{G(\theta)}.$$

That is, $$P_1(\theta) = \frac{1}{G(\theta)} \text{ or } P_1(\theta) = \frac{|G(\theta) - S(\theta)|}{G(\theta)}.$$

However, the present invention is not limited thereto. Instead, other equations could be used provided that it can enlarge a difference value between the current beam pattern $G(\theta)$ and the goal beam pattern $S(\theta)$ which will be described in the next step.

Hereinafter data calculation implemented at step S315 will be described with reference to FIG. 4, assuming there are n array elements.

At step S3150, a difference value f between the current beam pattern $G(\theta)$ and the goal beam pattern $S(\theta)$ is calculated. In this embodiment of the present invention, the difference value can be calculated using the equation of $f(w,\phi) = \int_0^\pi (G(\theta) - S(\theta))^2 \cdot P_1(\theta) \cdot d\theta$ or $$f(w, \phi) = \frac{\sqrt{\int_0^\pi G(\theta)^2 \cdot P_1(\theta) \cdot d\theta \cdot \int_0^\pi S(\theta)^2 \cdot P_1(\theta) \cdot d\theta}}{\int_0^\pi G(\theta) \cdot S(\theta) \cdot P_1(\theta) \cdot d\theta}.$$

Here, $f(w,\phi)$ indicates the difference value, $w=(w_1, w_2, \ldots, w_n)$ indicates the amplitudes of the n array elements, and $\phi=(\phi_1, \phi_2, \ldots, \phi_n)$ indicates phases of the n array elements. However, the present invention is not limited thereto. Instead, other calculation methods based on integrals with respect to $\theta$ as well as $P_1(\theta)$ could be used provided that it can indicate the difference value between the current beam pattern $G(\theta)$ and the goal beam pattern $S(\theta)$.

At step S3152, similar to step S1152, amplitude $w_i$ and phase $\varphi_i$ for each array element are calculated to make the difference value f minimum in turn from the first array element to the nth array element, with amplitudes and phases for other array elements being held meanwhile the determined values of amplitudes and phases replacing the previous corresponding values.

Compared with step S1152, a further step is included: each time after data which makes the difference value minimum for an array element is determined, updating the main weight function based on the determined data. And the updated main weight function will be used in the calculation for the next array element.

In detail, after values of amplitude $w_i$ and phase $\varphi_i$ for the ith array element are calculated, $P_1(\theta)$ will be updated, i.e., recalculated, using the equation in step S311 based on the determined $w_i$ and $\varphi_i$. And the updated $P_1(\theta)$ will be used in the calculation for the (i+1)th array element. For example, after values of amplitude $w_1$ and phase $\varphi_1$ for the first array element are calculated, $P_1(\theta)$ will be recalculated using the equation in step S311 based on the determined $w_1$ and $\varphi_1$. The updated $P_1(\theta)$ will be used in the calculation for the second array element.

At step S3154, a difference between the current difference value f and the previous difference value f is calculated. Here, the current difference value f means the difference value f after this implementation of step S3152, while the previous difference value f means the difference value f before this implementation of step S3152, for example the value determined at step S3150 or the value determined after the last implementation of step S3152.

At step S3156, it is judged if the calculated difference is less than the iteration precision $\varepsilon$. If so, step S320 which will be described later will be implemented. Otherwise, step S3152 will be implemented again for all of the n array elements.

It will be understood that steps S3154 and S3156 as well as S310 may be omitted in some cases to simplify the processing and provide a faster computing speed.

Referring back to FIG. 3, at step S320, the data of the current $w_1$-$w_n$ and $\varphi_1$-$\varphi_n$ are used to generate a beamforming vector. For example, the amplitude of each array element will be $w_1$-$w_n$ respectively, and the phase of each array element will be $\varphi_1$-$\varphi_n$ respectively.

Finally, at step S325, the signals to be transmitted through an antenna array are generated using the beamforming vector.

With the beamforming method according to this embodiment, since the main weight function is used, the difference between the current beam pattern and the goal beam pattern at those direction angels where $G(\theta)$ and $S(\theta)$ are considerably small (e.g the deep nulls of the sidelobe) is enlarged, thus the computing speed is further increased greatly.

Figure 5:
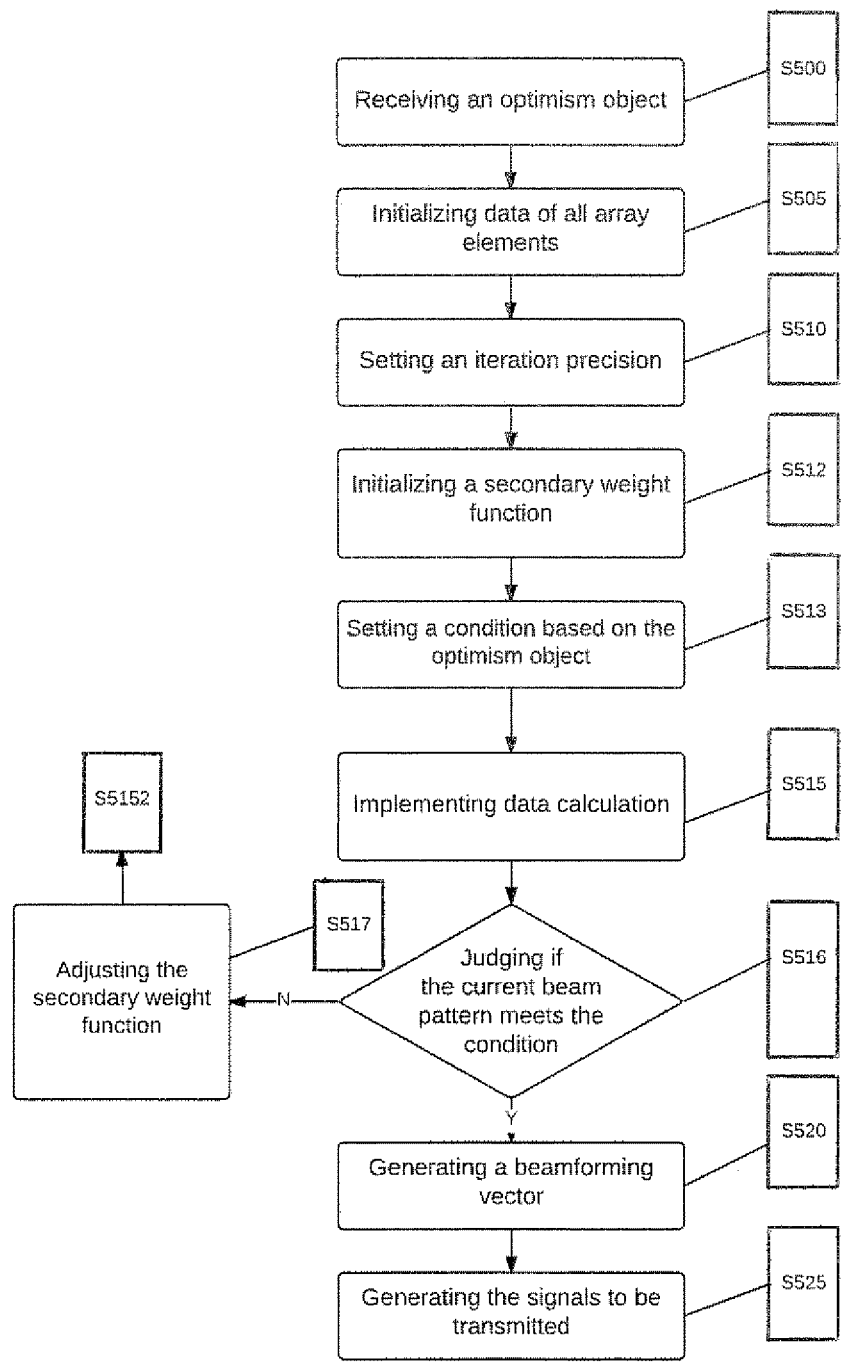
FIG. 5 is a flowchart illustrating a beamforming method according to still another embodiment of the present invention.
Figure 6:
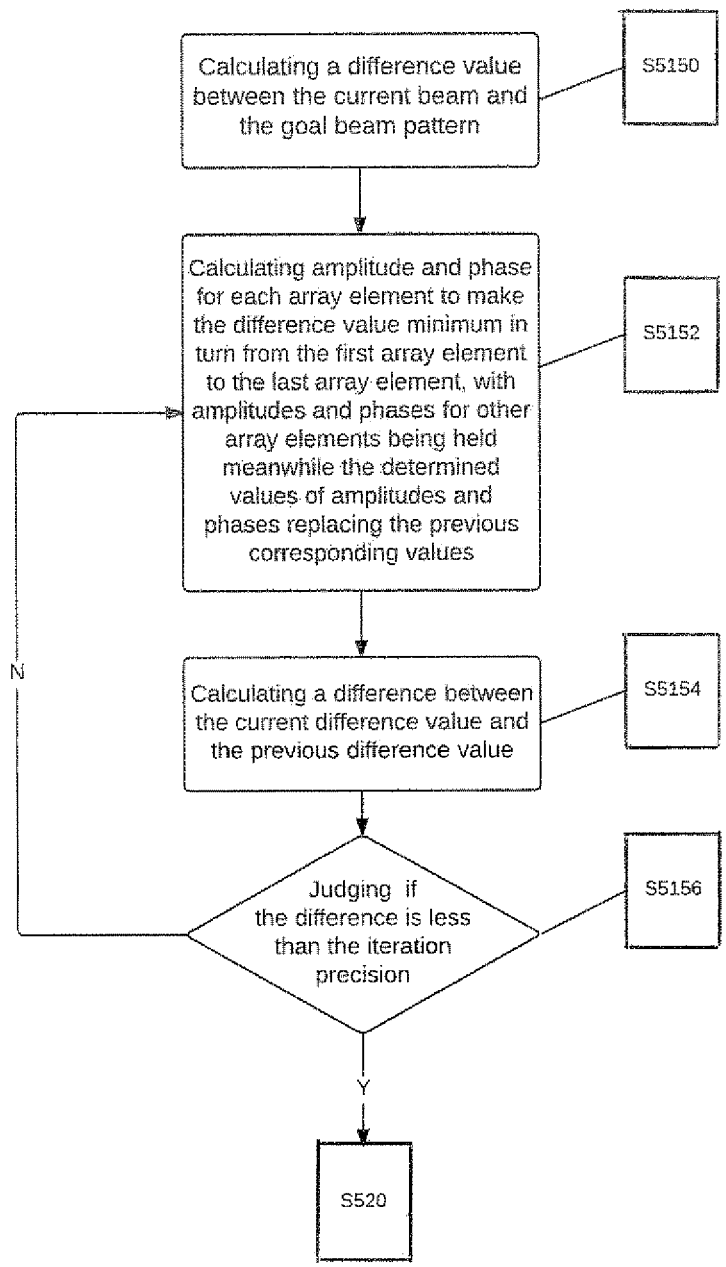
FIG. 6 is a detailed flowchart illustrating steps of data calculation of FIG. 5.

FIG. 5 is a flowchart illustrating a beamforming method according to still another embodiment of the present invention, and FIG. 6 is a detailed flowchart illustrating steps of data calculation of FIG. 5.

Referring to FIG. 5, a beamforming method according to this embodiment will be described hereinafter, wherein steps S500 to S510 are similar to steps S100 to S110 of FIG. 1 and detailed description thereof will be omitted.

At step S512, a secondary weight function which can be indicated as $P_2(\theta)$ is initialized, for example as 1. That is, $P_2(\theta)=1$.

At step S513, a condition which can be indicated as OP is preset based on the optimism object.

Hereinafter data calculation implemented at step S515 will be described with reference to FIG. 6, assuming there are n array elements.

At step S5150, a difference value f between the current beam pattern $G(\theta)$ and the goal beam pattern $S(\theta)$ is calculated. In this embodiment of the present invention, the difference value can be calculated using the equation of $f(w,\phi))=\int_0^\pi (G(\theta)-S(\theta))^2 \cdot P_2(\theta) \cdot d\theta$ or $$f(w,\phi) = \frac{\sqrt{\int_0^\pi G(\theta)^2 \cdot P_2(\theta) \cdot d\theta \cdot \int_0^\pi S(\theta)^2 \cdot P_2(\theta) \cdot d\theta}}{\int_0^\pi G(\theta) \cdot S(\theta) \cdot P_2(\theta) \cdot d\theta}.$$

Here, $f(w,\phi)$ indicates the difference value, $w=(w_1, w_2, \ldots, w_n)$ indicates the amplitudes of the n array elements, and $\phi=(\phi_1, \phi_2, \ldots, \phi_n)$ indicates phases of the n array elements. However, the present invention is not limited thereto. Instead, other calculation methods based on integrals with respect to $\theta$ as well as $P_2(\theta)$ could be used provided that it can indicate the difference between the current beam pattern $G(\theta)$ and the goal beam pattern $S(\theta)$.

The following steps S5152 to S5156 are similar to step S1152 to S1156 of FIG. 2, detailed description thereof will be omitted in order to avoid redundancy.

At step S516, it is further judged if the current beam pattern meets the condition OP. If so, step S520 will be implemented. Otherwise, step S517 will be implemented.

At step S517, the secondary weight function $P_2(\theta)$ is adjusted by adding a positive number to the secondary weight for the angles in which the corresponding current beam pattern does not meet the condition OP. That is, the current $P_2(\theta_{not\ satisfied})$ will be increased U. Here, $\theta_{not\ satisfied}$ indicates the angles in which the corresponding current beam pattern does not meet the condition OP, and U is a positive number. After that, the method will go back to step S5152, that is, a new turn of data calculation will be implemented.

At step S520, the data of the current $w_1$-$w_n$ and $\varphi_1$-$\varphi_n$ are used to generate a beamforming vector. For example, the amplitude of each array element will be $w_1$-$w_n$ respectively, and the phase of each array element will be $\varphi_1$-$\varphi_n$ respectively.

Finally, at step S525, the signals to be transmitted through an antenna array are generated using the beamforming vector.

With the beamforming method according to this embodiment of the present invention, the secondary weight function if further used and a further comparison is made to judge if the obtained beam pattern meets the condition. And if the condition is not met, the secondary weight function will be added a positive number and a further turn of data calculation will be implemented. Accordingly, the finally obtained beam pattern will be closer to the goal beam pattern compared with the embodiments in which no secondary weight function is used and thus this method is especially applicable to realize the optimism object of maximizing sidelobe attenuation and minimizing mainlobe ripple.

Figure 7:
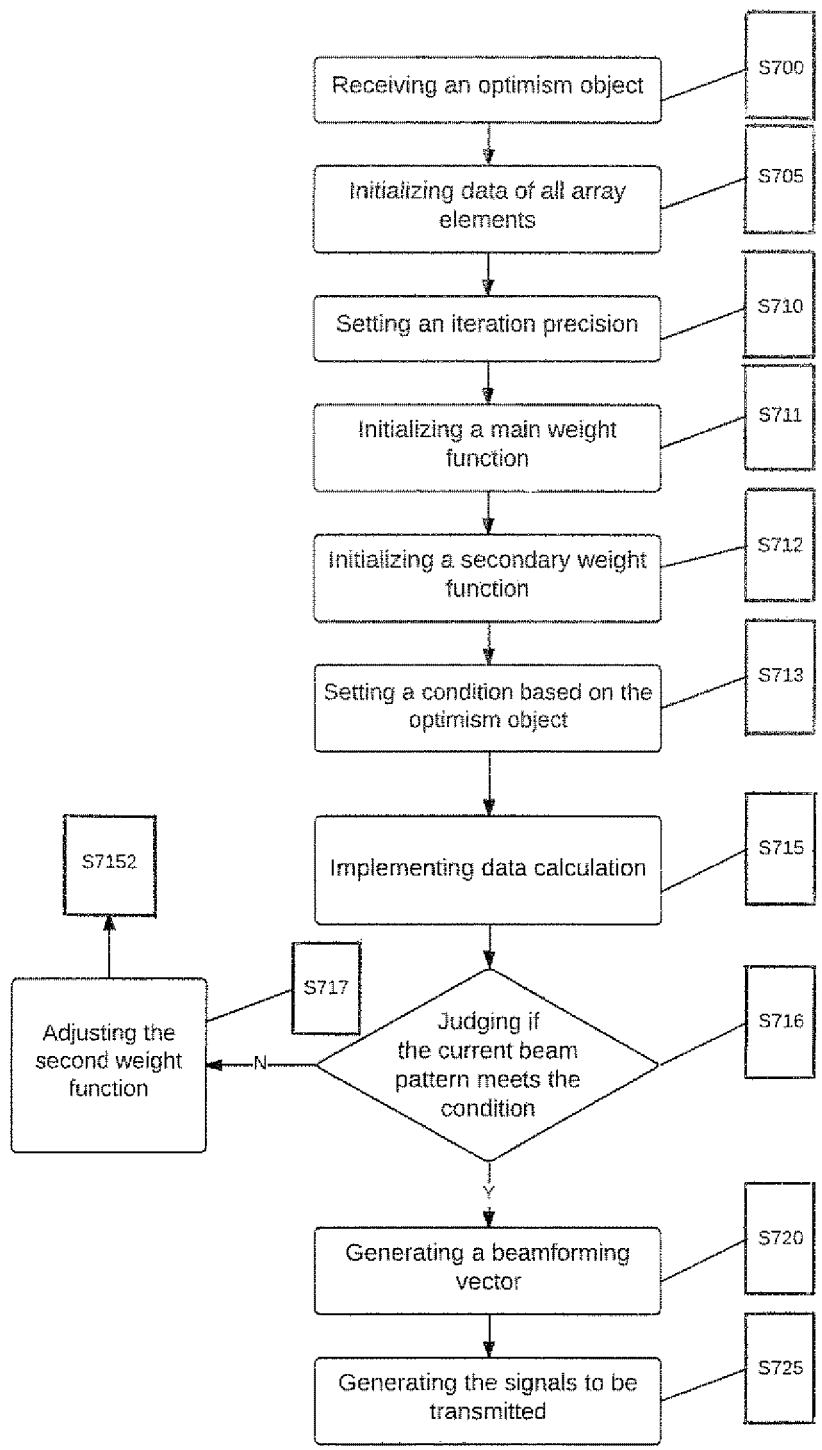
FIG. 7 is a flowchart illustrating a beamforming method according to still another embodiment of the present invention.
Figure 8:
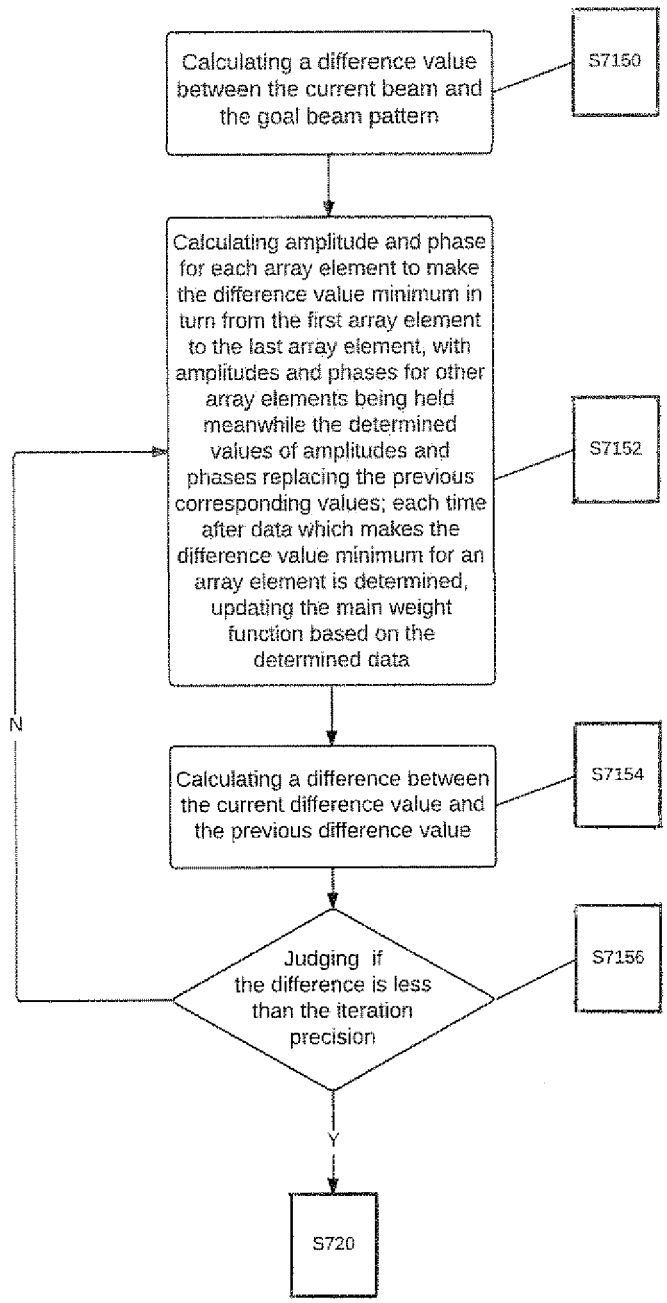
FIG. 8 is a detailed flowchart illustrating steps of data calculation of FIG. 7.

FIG. 7 is a flowchart illustrating a beamforming method according to still another embodiment of the present invention, and FIG. 8 is a detailed flowchart illustrating steps of data calculation of FIG. 7.

Referring to FIG. 7, a beamforming method according to this embodiment will be described hereinafter, wherein steps S700 to S710 are similar to steps S100 to S110 of FIG. 1 and detailed description thereof will be omitted.

At step S711, a main weight function which can be indicated as $P_1(\theta)$ is initialized. For example, $P_1(\theta)$ can be initialized as $$\frac{1}{G(\theta)} \text{ or } \frac{|G(\theta)-S(\theta)|}{G(\theta)}.$$

That is, $$P_1(\theta) = \frac{1}{G(\theta)} \text{ or } P_1(\theta) = \frac{|G(\theta)-S(\theta)|}{G(\theta)}.$$

However, the present invention is not limited thereto. Instead, other equations could be used provided that it can enlarge a difference value between the current beam pattern $G(\theta)$ and the goal beam pattern $S(\theta)$ which will be described in the following step S715.

At step S712, a secondary weight function which can be indicated as $P_2(\theta)$ is further initialized, for example as 1. That is, $P_2(\theta)=1$.

At step S713, a condition which can be indicated as OP is preset based on the optimism object.

Hereinafter data calculation implemented at step S715 will be described with reference to FIG. 8, assuming there are n array elements.

At step S7150, a difference value f between the current beam pattern $G(\theta)$ and the goal beam pattern $S(\theta)$ is calculated. In this embodiment, the difference value can be calculated using the equation of $f(w,\phi)=\int_0^\pi (G(\theta)-S(\theta))^2 \cdot P_1(\theta) P_2(\theta) \cdot d\theta$ or $$f(w,\phi) = \frac{\sqrt{\int_0^\pi G(\theta)^2 \cdot P_1(\theta) \cdot P_2(\theta) \cdot d\theta \cdot \int_0^\pi S(\theta)^2 \cdot P_1(\theta) \cdot P_2(\theta) \cdot d\theta}}{\int_0^\pi G(\theta) \cdot S(\theta) \cdot P_1(\theta) \cdot P_2(\theta) \cdot d\theta}.$$

Here, $f(w,\phi)$ indicates the difference value, $w=(w_1, w_2, \ldots, w_n)$ indicates the amplitudes of the n array elements, and $\phi=(\phi_1, \phi_2, \ldots, \phi_n)$ indicates phases of the n array elements. However, the present invention is not limited thereto. Instead, other calculation methods based on integrals with respect to $\theta$ as well as $P_1(\theta)$ and $P_2(\theta)$ provided that it can indicate the difference between the current beam pattern $G(\theta)$ and the goal beam pattern $S(\theta)$.

The following steps S7152 to S7156 are similar to steps S3152 to S3156 of FIG. 4, and the following steps S716 to S725 are similar to steps S516 to S525 of FIG. 5, thus detailed description thereof will be omitted in order to avoid redundancy.

With the beamforming method according to this embodiment, both of the main weight function and the secondary weight function are used, thus this method not only provides a fast computing speed, but also is especially applicable to realize the optimism object of maximizing sidelobe attenuation and minimizing mainlobe ripple.

A beamforming apparatus according to an embodiment of the present invention will be described with reference to FIG. 9.

Figure 9:
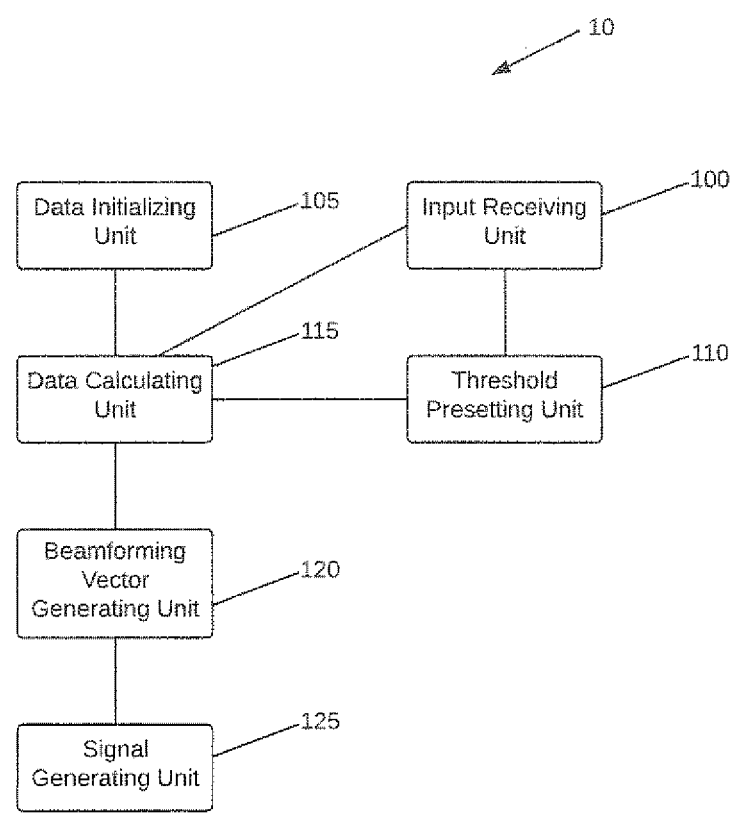
FIG. 9 is a schematic view illustrating a beamforming apparatus according to an embodiment of the present invention.

As shown in FIG. 9, a beamforming apparatus 10 according to an embodiment of the present invention includes an input receiving unit 100, a data initializing unit 105, a threshold presetting unit 110, a data calculation unit 115, a beamforming vector generating unit 120 and a signal generating unit 125.

The input receiving unit 100 receives an optimism object input by a user. If it is determined that there is no given goal beam pattern included in the optimism object, a goal beam pattern can be further established in the input receiving unit 100 based on the optimism object.

In an embodiment, the goal beam pattern can be indicated as $S(\theta)$, wherein $\theta$ indicates direction angle.

The data initializing unit 105 initializes data of all array elements and then calculates a current beam pattern which can be indicated as $G(\theta)$ based on the initialized data. For example, amplitude w of each array element is initialized as 1 which is the largest amplitude while 0 is the smallest one, phase $\phi$ of each array element is initialized as 0.

The threshold presetting unit 110 presets a threshold, for example, an iteration precision which can be indicated as e, based on the user's requirement of speed and accuracy for the optimization processes received also by the input receiving unit 100.

The data calculation unit 115 firstly calculates a difference value f between the current beam pattern $G(\theta)$ output from the data initializing unit 105 and the goal beam pattern $S(\theta)$ output from the input receiving unit 100. In an embodiment, the difference value can be calculated using the equation of $f(w,\phi)=\int_0^\pi (G(\theta)-S(\theta))^2 \cdot d\theta$. Alternatively, equation of $$f(w,\phi) = \frac{\sqrt{\int_0^\pi G(\theta)^2 \cdot d\theta \cdot \int_0^\pi S(\theta)^2 \cdot d\theta}}{\int_0^\pi G(\theta) \cdot S(\theta) \cdot d\theta}$$

can be used. Here, $f(w,\phi)$ indicates the difference value, $w=(w_1, w_2, \ldots, w_n)$ indicates the amplitudes of the n array elements, and $\phi=(\phi_1, \phi_2, \ldots, \phi_n)$ indicates phases of the n array elements. However, the present invention is not limited thereto. Instead, other calculation methods based on integrals with respect to $\theta$ can be used provided that it can indicate the difference between the current beam pattern $G(\theta)$ and the goal beam pattern $S(\theta)$.

Then, the data calculation unit 115 implements data calculation for all of the array elements. In detail, amplitude $w_i$ and phase $\phi_i$ for each array element are calculated to make the difference value f minimum in turn from the first array element to the nth array element, with the data of other array elements being held and determined data replacing previous data. That is, values of amplitudes and phases for other array elements are held, and the determined values of amplitudes and phases replacing the previous corresponding values.

Any of the existing numerical methods, such as Conjugate Gradient Method, Gradient Descent Method, Newton's Method etc., can be used to calculate the amplitude and the phase for each array element, and detailed description thereof will be omitted since it is well known for those skilled in the art.

In the data calculation unit 115, a difference between the current difference value f and the previous difference value f is then calculated, and it is further judged if the calculated difference is less than the iteration precision e which is output from the threshold presetting unit 110. If so, the data of the current $w_1$-$w_n$ and $\phi_1$-$\phi_n$ will be sent to the beamforming vector generating unit 120. Otherwise, amplitude $w_i$ and phase $\phi_i$ for each array element will be implemented again for all of the n array elements.

It will be understood that the steps of calculating the difference between the current difference value f and the previous difference value f and further judging if the calculated difference is less than the iteration precision ε as well as the threshold presetting unit 110 may be omitted in some cases to simplify the processing and provide a faster computing speed.

The beamforming vector generating unit 120 generates a beamforming vector using the data of the current $w_1$-$w_n$ and $\varphi_1$-$\varphi_n$ sent from the data calculation unit 115. For example, the amplitude of each array element will be $w_1$-$w_n$ respectively, and the phase of each array element will be $\varphi_1$-$\varphi_n$ respectively.

The signal generating unit 125 generates the signals to be transmitted through an antenna array using the beamforming vector sent from the beamforming vector generating unit 120.

Similar to the beamforming method as shown in FIGS. 1 and 2, the beamforming apparatus according to this has a wide range of use and a fast computing speed.

Figure 10:
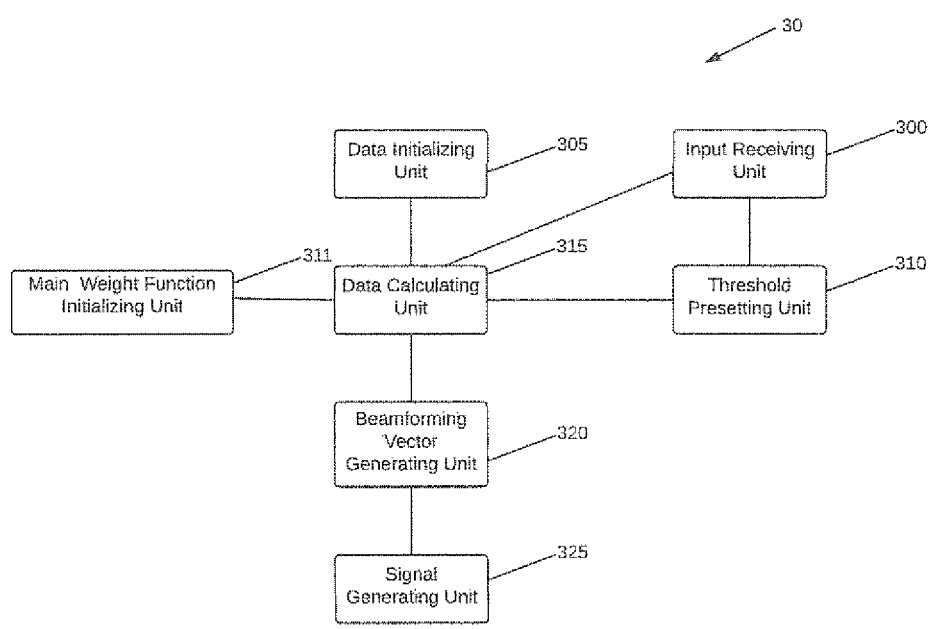
FIG. 10 is a schematic view illustrating a beamforming apparatus according to another embodiment of the present invention.

FIG. 10 shows a schematic view illustrating a beamforming apparatus according to another embodiment of the present invention. As shown in FIG. 10, a beamforming apparatus 30 according to this embodiment includes an input receiving unit 300, a data initializing unit 305, a threshold presetting unit 310, a main weight function initializing unit 311, a data calculation unit 315, a beamforming vector generating unit 320 and a signal generating unit 325.

The input receiving unit 300, the data initializing unit 305 and the threshold presetting unit 310 are similar to the input receiving unit 100, the data initializing unit 105 and the threshold presetting unit 110 of FIG. 9, and detailed description thereof will be omitted.

The main weight function initializing unit 311 initializes a main weight function which can be indicated as $P_1(\theta)$, for example, as $$\frac{1}{G(\theta)} \text{ or } \frac{|G(\theta) - S(\theta)|}{G(\theta)}.$$

That is, $$P_1(\theta) = \frac{1}{G(\theta)} \text{ or } P_1(\theta) = \frac{|G(\theta) - S(\theta)|}{G(\theta)}.$$

However, the present invention is not limited thereto. Instead, other equations could be used provided that it can enlarge a difference value between the current beam pattern $G(\theta)$ and the goal beam pattern $S(\theta)$.

The data calculation unit 315 firstly calculates a difference value f between the current beam pattern $G(\theta)$ sent from the data initializing unit 305 and the goal beam pattern $S(\theta)$ sent from the input receiving unit 300. In an embodiment, the difference value can be calculated based on $P_1(\theta)$ output from the main weight function initializing unit 311, for example using the equation of $f(w,\phi)=\int_0^\pi (G(\theta)-S(\theta))^2 \cdot P_1(\theta) \cdot d\theta$ or $$f(w, \phi) = \frac{\sqrt{\int_0^\pi G(\theta)^2 \cdot P_1(\theta) \cdot d\theta \cdot \int_0^\pi S(\theta)^2 \cdot P_1(\theta) \cdot d\theta}}{\int_0^\pi G(\theta) \cdot S(\theta) \cdot P_1(\theta) \cdot d\theta}.$$

Here, $f(w,\phi)$ indicates the difference value, $w=(w_1, w_2, \ldots, w_n)$ indicates the amplitudes of the n array elements, and $\phi=(\phi_1, \phi_2, \ldots, \phi_n)$ indicates phases of the n array elements. However, the present invention is not limited thereto. Instead, other calculation methods based on integrals with respect to B as well as $P_1(\theta)$ could be used provided that it can indicate the difference value between the current beam pattern $G(\theta)$ and the goal beam pattern $S(\theta)$.

Secondly, the data calculation unit 315 implements data calculation for all of the array elements. In detail, amplitude $w_i$ and phase $\varphi_i$ for each array element are calculated to make the difference value f minimum in turn from the first array element to the nth array element, with amplitudes and phases for other array elements being held meanwhile the determined values of amplitudes and phases replacing the previous corresponding values.

Furthermore, each time after data which makes the difference value minimum for an array element is determined, the main weight function is updated in the data calculation unit 315 based on the determined data, and the updated main weight function will be used in the calculation for the next array element.

Also, in the data calculation unit 315, a difference between the current difference value f and the previous difference value f is then calculated, and it is further judged if the calculated difference is less than the iteration precision ε which is output from the threshold presetting unit 310. If so, the data of the current $w_1$-$w_n$ and $\varphi_1$-$\varphi_n$ will be sent to the beamforming vector generating unit 320. Otherwise, amplitude $w_i$ and phase $\varphi_i$ for each array element will be implemented again for all of the n array elements.

It will be understood that the steps of calculating the difference between the current difference value f and the previous difference value f and further judging if the calculated difference is less than the iteration precision ε as well as the threshold presetting unit 310 may be omitted in some cases to simplify the processing and provide a faster computing speed.

The beamforming vector generating unit 320 generates a beamforming vector using the data of the current $w_1$-$w_n$ and $\varphi_1$-$\varphi_n$ sent from the data calculation unit 315. For example, the amplitude of each array element will be $w_1$-$w_n$ respectively, and the phase of each array element will be $\varphi_1$-$\varphi_n$ respectively.

The signal generating unit 325 generates the signals to be transmitted through an antenna array using the beamforming vector sent from the beamforming vector generating unit 320.

Similar to the beamforming method as shown in FIGS. 3 and 4, the beamforming apparatus according to this has a greatly increased computing speed compared with the beamforming apparatus as shown in FIG. 9.

Figure 11:
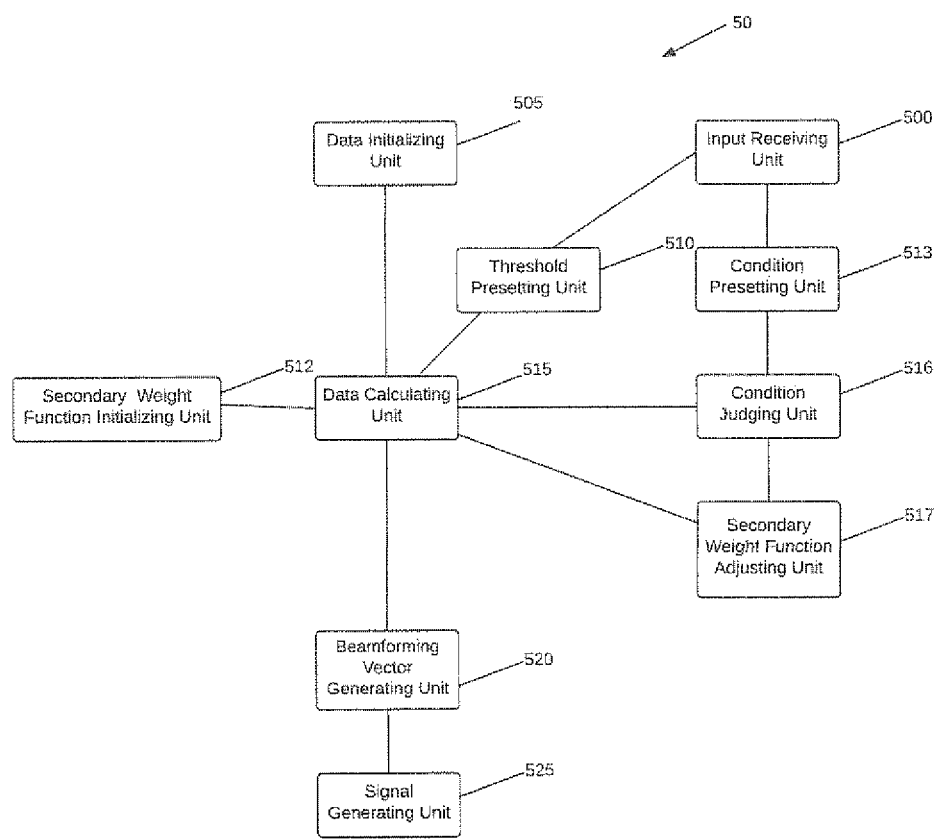
FIG. 11 is a schematic view illustrating a beamforming apparatus according to still another embodiment of the present invention.

FIG. 11 shows a schematic view illustrating a beamforming apparatus according to still another embodiment of the present invention. As shown in FIG. 11, a beamforming apparatus 50 according to this embodiment includes an input receiving unit 500, a data initializing unit 505, a threshold presetting unit 510, a secondary weight function initializing unit 512, a condition presetting unit 513, a data calculation unit 515, a condition judging unit 516, a secondary weight function adjusting unit 517, a beamforming vector generating unit 520 and a signal generating unit 525.

The input receiving unit 500, the data initializing unit 505 and the threshold presetting unit 510 are similar to the input receiving unit 100, the data initializing unit 105 and the threshold presetting unit 110 of FIG. 9, and detailed description thereof will be omitted.

The secondary weight function initializing unit 512 initializes a secondary weight function which can be indicated as $P_2(\theta)$, for example, as 1. That is, $P_2(\theta)=1$.

The condition presetting unit 513 presets a condition which can be indicated as OP based on the optimism object output from the input receiving unit 500.

The data calculation unit 515 firstly calculates a difference value f between the current beam pattern G(θ) output from the data initializing unit 505 and the goal beam pattern S(θ) output from the input receiving unit 500. In an embodiment, the difference value can be calculated using the equation of $f(w,\phi)=\int_0^\pi (G(\theta)-S(\theta))^2 \cdot P_2(\theta) \cdot d\theta$ or $$f(w, \phi) = \frac{\sqrt{\int_0^\pi G(\theta)^2 \cdot P_2(\theta) \cdot d\theta \cdot \int_0^\pi S(\theta)^2 \cdot P_2(\theta) \cdot d\theta}}{\int_0^\pi G(\theta) \cdot S(\theta) \cdot P_2(\theta) \cdot d\theta}.$$

Here, f(w,φ) indicates the difference value, w=(w$_1$, w$_2$, ..., w$_n$) indicates the amplitudes of the n array elements, and φ=(φ$_1$, φ$_2$, ..., φ$_n$) indicates phases of the n array elements. However, the present invention is not limited thereto. Instead, other calculation methods based on integrals with respect to θ as well as P$_2$(θ) could be used provided that it can indicate the difference between the current beam pattern G(θ) and the goal beam pattern S(θ).

Next, the data calculation unit 515 implements data calculation which is similar to the data calculation implemented in the data calculation unit 115 of FIG. 9, detailed description thereof will be omitted in order to avoid redundancy.

The condition judging unit 516 judges if the current beam pattern meets the condition OP output from the condition presetting unit 513. If so, the condition judging unit 516 will send the judging result of the condition being met to the data calculation unit 515 which will then send the current w$_1$-w$_n$ and φ$_1$-φ$_n$ to the beamforming vector generating unit 520. Otherwise, the judging result of the condition being not met will be sent to the secondary weight function adjusting unit 517.

The secondary weight function adjusting unit 517 updates the secondary weight function P$_2$(θ) by adding a positive number to the secondary weight function P$_2$(θ) for the angles in which the corresponding current beam pattern does not meet the condition OP after receiving the judging result of the condition being not met. That is, the current P$_2$ (θ$_{not\ satisfied}$) will be increased U. Here, S$_{not\ satisfied}$ indicates the angles in which the corresponding current beam pattern does not meet the condition OP, and U is a positive number. After that, the secondary weight function adjusting unit 517 will output the adjusted secondary weight function to the data calculation unit 515 so that it can be used in a new turn of data calculation.

The beamforming vector generating unit 520 generates a beamforming vector using the data of the current w$_1$-w$_n$ and φ$_1$-φ$_n$ sent from the data calculation unit 515. For example, the amplitude of each array element will be w$_1$-w$_n$ respectively, and the phase of each array element will be φ$_1$-φ$_n$ respectively.

The signal generating unit 525 generates the signals to be transmitted through an antenna array using the beamforming vector sent from the beamforming vector generating unit 520.

Similar to the beamforming method as shown in FIGS. 5 and 6, the beamforming apparatus according to this embodiment is especially applicable to realize the optimism object of maximizing sidelobe attenuation and minimizing mainlobe ripple.

Figure 12:
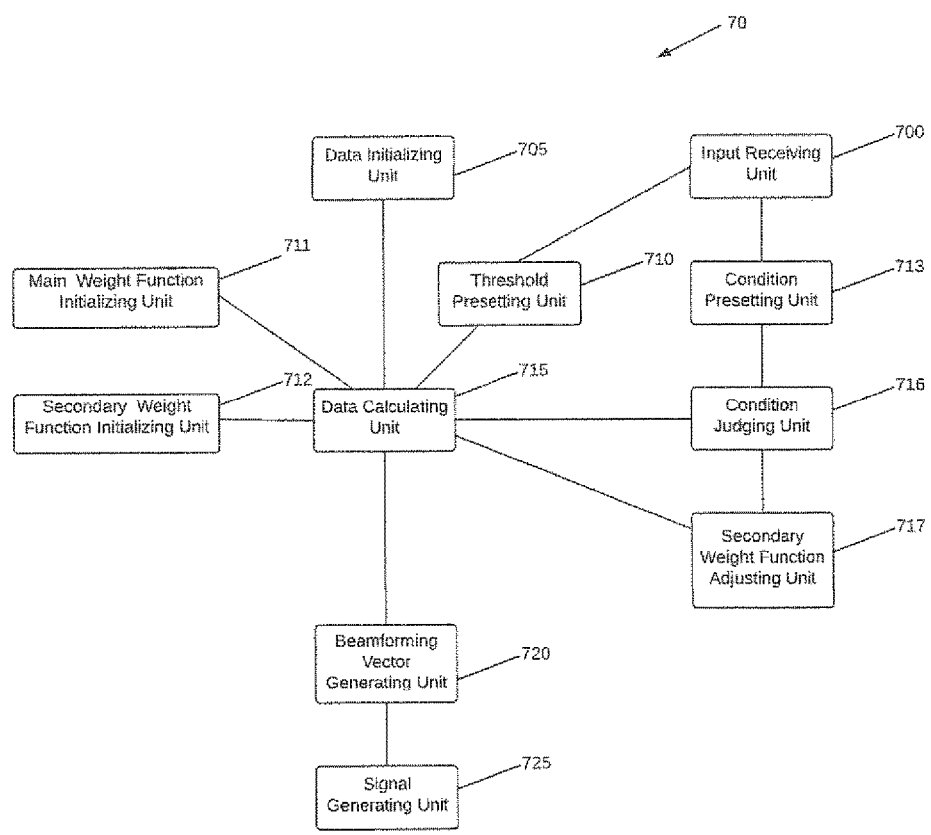
FIG. 12 is a schematic view illustrating a beamforming apparatus according to still another embodiment of the present invention.

FIG. 12 shows a schematic view illustrating a beamforming apparatus according to still another embodiment of the present invention. As shown in FIG. 12, a beamforming apparatus 70 according to this embodiment includes an input receiving unit 700, a data initializing unit 705, a threshold presetting unit 710, a main weight function initializing unit 711, a secondary weight function initializing unit 712, a condition presetting unit 713, a data calculation unit 715, a condition judging unit 716, a secondary weight function adjusting unit 717, a beamforming vector generating unit 720 and a signal generating unit 725.

The input receiving unit 700, the data initializing unit 705 and the threshold presetting unit 710 are similar to the input receiving unit 100, the data initializing unit 105 and the threshold presetting unit 110 of FIG. 9, and detailed description thereof will be omitted.

The main weight function initializing unit 711 initializes a main weight function which can be indicated as P$_1$(θ), for example, as $$\frac{1}{G(\theta)} \text{ or } \frac{|G(\theta) - S(\theta)|}{G(\theta)}.$$

That is, $$P_1(\theta) = \frac{1}{G(\theta)} \text{ or } P_1(\theta) = \frac{|G(\theta) - S(\theta)|}{G(\theta)}.$$

The secondary weight function initializing unit 712 initializes a secondary weight function which can be indicated as P$_2$(θ), for example, as 1. That is, P$_2$ (θ)=1.

The condition presetting unit 713 presets a condition which can be indicated as OP based on the optimism object output from the input receiving unit 700.

The data calculation unit 715 firstly calculates a difference value f between the current beam pattern G(θ) output from the data initializing unit 705 and the goal beam pattern S(θ) output from the input receiving unit 700. In an embodiment, the difference value can be calculated using the equation of $f(w,\phi)=\int_0^\pi (G(\theta)-S(\theta))^2 \cdot P_1(\theta) \cdot P_2(\theta) \cdot d\theta$ or $$f(w, \phi) = \frac{\sqrt{\int_0^\pi G(\theta)^2 \cdot P_1(\theta) \cdot P_2(\theta) \cdot d\theta \cdot \int_0^\pi S(\theta)^2 \cdot P_1(\theta) \cdot P_2(\theta) \cdot d\theta}}{\int_0^\pi G(\theta) \cdot S(\theta) \cdot P_1(\theta) \cdot P_2(\theta) \cdot d\theta}.$$

Here, f(w,φ) indicates the difference value, w=(w$_1$, w$_2$, ..., w$_n$) indicates the amplitudes of the n array elements, and φ=(φ$_1$, φ$_2$, ..., φ$_n$) indicates phases of the n array elements. However, the present invention is not limited thereto. Instead, other calculation methods based on integrals with respect to θ as well as P$_1$(θ) and P$_2$(θ) provided that it can indicate the difference between the current beam pattern G(θ) and the goal beam pattern S(θ).

Next, the data calculation unit 715 implements data calculation which is similar to the data calculation in the data calculation unit 315 of FIG. 10. Furthermore, the condition judging unit 716, the secondary weight function adjusting unit 717, the beamforming vector generating unit 720 and the signal generating unit 725 are similar to the condition judging unit 516, the secondary weight function adjusting unit 517, the beamforming vector generating unit 520 and the signal generating unit 525 of FIG. 11, detailed description thereof will be omitted in order to avoid redundancy.

Similar to the beamforming method as shown in FIGS. 7 and 8, the beamforming apparatus according to this embodiment not only provides a fast computing speed, but also is especially applicable to realize the optimism object of maximizing sidelobe attenuation and minimizing mainlobe ripple.

While the present disclosure has been described with reference to exemplary embodiments, it will be apparent to those skilled in the art that various changes and modifications may be made without departing from the spirit and scope of the present invention. Therefore, the above embodiments are provided for illustrative purposes only, and should not in any sense be interpreted as limiting the scope of the present disclosure.

The invention claimed is:

1. A beamforming method, comprising the steps of:
initializing data of array elements of an antenna array and calculating a current beam pattern based on the initialized data;
calculating a difference value between the current beam pattern and a goal beam pattern, and determining data which makes the difference value minimum respectively for each array element using a numerical method in turn from the first array element to the last array element, with the data of other array elements being held and determined data replacing previous data;
generating a beamforming vector using the determined data and generating signals to be transmitted using the beamforming vector; and repeating the step of determining data until a difference between the current difference value and the previous difference value is less than a preset threshold.

2. The beamforming method according to claim 1, wherein the following equation is used to calculate the difference value between the current beam pattern and the goal beam pattern: $f(w,\phi)=\int_0^\pi (G(\theta)-S(\theta))^2 \cdot d\theta$ or $$f(w,\phi) = \frac{\sqrt{\int_0^\pi G(\theta)^2 \cdot d\theta \cdot \int_0^\pi S(\theta)^2 \cdot d\theta}}{\int_0^\pi G(\theta) \cdot S(\theta) \cdot d\theta},$$

wherein $f(w,\phi)$ indicates the difference value, w indicates amplitudes of the array elements, $\phi$ indicates phases of the array elements, $\theta$ indicates direction angle, $G(\theta)$ indicates the current beam pattern, and $S(\theta)$ indicates the goal beam pattern.

3. The beamforming method according to claim 1, further comprising:
initializing a main weight function;
wherein the step of calculating the difference value between the current beam pattern and the goal beam pattern includes calculating the difference value based on the main weight function; and
the method further comprising: each time after data which makes the difference value minimum for an array element is determined, updating the main weight function based on the determined data.

4. The beamforming method according to claim 3, wherein the main weight function is initialed and updated as $$P_1(\theta) = \frac{1}{G(\theta)} \text{ or } P_1(\theta) = \frac{|G(\theta)-S(\theta)|}{G(\theta)},$$

wherein $P_1(\theta)$ indicates the main weight function, $\theta$ indicates direction angle, $G(\theta)$ indicates the current beam pattern, and $S(\theta)$ indicates the goal beam pattern; and
wherein the following equation is used to calculate the difference value between the current beam pattern and the goal beam pattern: $f(w,\phi)=\int_0^\pi (G(\theta)-S(\theta))^2 \cdot P_1(\theta) \cdot d\theta$ or $$f(w,\phi) = \frac{\sqrt{\int_0^\pi G(\theta)^2 \cdot P_1(\theta) \cdot d\theta \cdot \int_0^\pi S(\theta)^2 \cdot P_1(\theta) \cdot d\theta}}{\int_0^\pi G(\theta) \cdot S(\theta) \cdot P_1(\theta) \cdot d\theta},$$

wherein $f(w,\phi)$ indicates the difference value, w indicates amplitudes of the array elements and $\phi$ indicates phases of the array elements.

5. The beamforming method according to claim 1, further comprising:
initializing a secondary weight function;
wherein the step of calculating the difference value between the current beam pattern and the goal beam pattern includes calculating the difference value based on the secondary weight function; and
the method further comprising: adjusting the secondary weight function by adding a positive number for the angles in which the corresponding current beam pattern does not meet a preset condition before forming the beamforming vector, and implementing the step of determining data again based on the updated secondary weight function.

6. The beamforming method according to claim 5, wherein the secondary weight function is initialized as $P_2(\theta)=1$, wherein $P_2(\theta)$ indicates the secondary weight function,
wherein the following equation is used to calculate the difference value between the current beam pattern and the goal beam pattern: $f(w,\phi)=\int_0^\pi (G(\theta)-S(\theta))^2 \cdot P_2(\theta) \cdot d\theta$ or $$f(w,\phi) = \frac{\sqrt{\int_0^\pi G(\theta)^2 \cdot P_2(\theta) \cdot d\theta \cdot \int_0^\pi S(\theta)^2 \cdot P_2(\theta) \cdot d\theta}}{\int_0^\pi G(\theta) \cdot S(\theta) \cdot P_2(\theta) \cdot d\theta},$$

wherein $f(w,\phi)$ indicates the difference value, w indicates amplitudes of the array elements, $\phi$ indicates phases of the array elements, $\theta$ indicates direction angle, $G(\theta)$ indicates the current beam pattern and $S(\theta)$ indicates the goal beam pattern.

7. The beamforming method according to claim 1, further comprising:
initializing a main weight function and a secondary weight function;
wherein the step of calculating the difference value between the current beam pattern and the goal beam pattern includes calculating the difference value based on the main weight function and the secondary weight function; and
the method further comprising:
each time after data which makes the difference value minimum for an array element is determined, updating the main weight function based on the determined data;
updating the secondary weight function by adding a positive number for the angles in which the corresponding current beam pattern does not meet a preset condition before forming the beamforming vector, and implementing the step of determining data again based on the updated secondary weight function.

8. The beamforming method according to claim 7, wherein the main weight function is initialed and updated as $$P_1(\theta) = \frac{1}{G(\theta)} \text{ or } P_1(\theta) = \frac{|G(\theta) - S(\theta)|}{G(\theta)},$$

wherein $P_1(\theta)$ indicates the main weight function, $\theta$ indicates direction angle, $G(\theta)$ indicates the current beam pattern, and $S(\theta)$ indicates the goal beam pattern;

wherein the secondary weight function is initialized as $P_2(\theta)=1$, wherein $P_2(\theta)$ indicates the secondary weight function; and wherein the following equation is used to calculate the difference value between the current beam pattern and the goal beam pattern: $f(w,\phi)=\int_0^\pi (G(\theta)-S(\theta))^2 \cdot P_1(\theta) \cdot P_2(\theta) \cdot d\theta$ or $$f(w, \phi) = \frac{\sqrt{\int_0^\pi G(\theta)^2 \cdot P_1(\theta) \cdot P_2(\theta) \cdot d\theta \cdot \int_0^\pi S(\theta)^2 \cdot P_1(\theta) \cdot P_2(\theta) \cdot d\theta}}{\int_0^\pi G(\theta) \cdot S(\theta) \cdot P_1(\theta) \cdot P_2(\theta) \cdot d\theta},$$

wherein $f(w,\phi)$ indicates the difference value, w indicates amplitudes of the array elements and $\phi$ indicates phases of the array elements.

9. The beamforming method according to claim 1, further comprising establishing a goal beam pattern based on an optimism object if the optimism object does not include the goal beam pattern.

10. A beamforming apparatus, comprising:
an input receiving unit configured to receive a goal beam pattern;
a data initializing unit configured to initialize data of array elements of an antenna array pattern and calculate a current beam pattern based on the initialized data;
a data calculation unit configured to calculate a difference value between the current beam pattern output from the data initializing unit and the goal beam pattern output from the input receiving unit, and determine data which makes the difference value minimum respectively for each array element using a numerical method in turn from the first array element to the last array element, with the data of other array elements being held and determined data replacing previous data;
a beamforming vector generating unit configured to generate a beamforming vector using the determined data sent from the data calculation unit;
a signal generating unit configured to generate signals to be transmitted using the beamforming vector sent from the beamforming vector generating unit; and
a threshold presetting unit configured to preset a threshold, wherein the data calculation unit is further configured to repeat the step of determining data until a difference between the current difference value and the previous difference value is less than the preset threshold output from the threshold presetting unit.

11. The beamforming apparatus according to claim 10, wherein the following equation is used to calculate the difference value between the current beam pattern and the goal beam pattern: $f(w,\phi)=\int_0^\pi (G(\theta)-S(\theta))^2 \cdot d\theta$ or $$f(w, \phi) = \frac{\sqrt{\int_0^\pi G(\theta)^2 \cdot d\theta \cdot \int_0^\pi S(\theta)^2 \cdot d\theta}}{\int_0^\pi G(\theta) \cdot S(\theta) \cdot d\theta},$$

wherein $f(w,\phi)$ indicates the difference value, w indicates amplitude, w indicates amplitudes of the array elements, $\phi$ indicates phases of the array elements, $G(\theta)$ indicates the current beam pattern, and $S(\theta)$ indicates the goal beam pattern.

12. The beamforming apparatus according to claim 10, further comprising a main weight function initializing unit configured to initialize a main weight function,
wherein the data calculation unit calculates the difference value between the current beam pattern and the goal beam pattern based on the main weight function output from the main weight function initializing unit; and
wherein the data calculation unit is further configured to: each time after data which makes the difference value minimum for an array element is determined, update the main weight function based on the determined data.

13. The beamforming apparatus according to claim 12, wherein the main weight function is initialed and updated as $$P_1(\theta) = \frac{1}{G(\theta)} \text{ or } P_1(\theta) = \frac{|G(\theta) - S(\theta)|}{G(\theta)},$$

wherein $P_1(\theta)$ indicates the main weight function, $\theta$ indicates direction angle, $G(\theta)$ indicates the current beam pattern, and $S(\theta)$ indicates the goal beam pattern; and
wherein the following equation is used to calculate the difference value between the current beam pattern and the goal beam pattern: $f(w,\phi)=\int_0^\pi (G(\theta)-S(\theta))^2 \cdot P_1(\theta) \cdot d\theta$ or $$f(w, \phi) = \frac{\sqrt{\int_0^\pi G(\theta)^2 \cdot P_1(\theta) \cdot d\theta \cdot \int_0^\pi S(\theta)^2 \cdot P_1(\theta) \cdot d\theta}}{\int_0^\pi G(\theta) \cdot S(\theta) \cdot P_1(\theta) \cdot d\theta},$$

wherein $f(w,\phi)$ indicates the difference value, w indicates amplitudes of the array elements and $\phi$ indicates phases of the array elements.

14. The beamforming apparatus according to claim 10, further comprising a secondary weight function initializing unit configured to initialize a secondary weight function;
wherein the data calculation unit calculates the difference value between the current beam pattern and the goal beam pattern based on the secondary weight function output from the secondary weight function initializing unit; and
the beamforming apparatus further comprising:
a condition presetting unit configured to preset a condition;
a condition judging unit configured to judge if the current beam pattern meets the condition output from the condition presetting unit, and send the judging result of the condition being met to the data calculation unit if the condition is met, and send the judging result of the condition being not met to the secondary weight function adjusting unit if the condition is not met;
a secondary weight function adjusting unit configured to adjust the secondary weight function by adding a positive number for the angles in which the corresponding current beam pattern does not meet a preset condition, and output the adjusted secondary weight function to the data calculation unit, wherein the data calculation unit is further configured to implement the step of determining data again based on the updated secondary weight function output from the secondary weight function adjusting unit, and send the determined data to the beamforming vector generating unit after receiving the judging result of the condition being met.

15. The beamforming apparatus according to claim 14, wherein the secondary weight function is initialized as $P_2(\theta)=1$, wherein $P_2(\theta)$ indicates the secondary weight function, wherein the following equation is used to calculate the difference value between the current beam pattern and the goal beam pattern: $f(w,\phi)=\int_0^\pi (G(\theta)-S(\theta))^2 \cdot P_2\theta) \cdot d\theta$ or $$f(w, \phi) = \frac{\sqrt{\int_0^\pi G(\theta)^2 \cdot P_2(\theta) \cdot d\theta \cdot \int_0^\pi S(\theta)^2 \cdot P_2(\theta) \cdot d\theta}}{\int_0^\pi G(\theta) \cdot S(\theta) \cdot P_2(\theta) \cdot d\theta},$$

wherein $f(w,\phi)$ indicates the difference value, w indicates amplitudes of the array elements, $\phi$ indicates phases of the array elements, $\theta$ indicates direction angle, $G(\theta)$ indicates the current beam pattern and $S(\theta)$ indicates the goal beam pattern.

16. The beamforming apparatus according to claim 10, further comprising:

a main weight function initializing unit configured to initialize a main weight function;

a secondary weight function initializing unit configured to initialize a secondary weight function;

wherein the data calculating unit calculates the difference value between the current beam pattern and the goal beam pattern based on the main weight function output from the main weight function initializing unit and the secondary weight function output from the secondary weight function initializing unit; and the beamforming apparatus further comprising:

a condition presetting unit configured to preset a condition;

a condition judging unit configured to judge if the current beam pattern meets the condition output from the condition presetting unit, and send the judging result of the condition being met to the data calculation unit if the condition is met, and send the judging result of the condition being not met to the secondary weight function adjusting unit if the condition is not met;

a secondary weight function adjusting unit configured to adjust the secondary weight function by adding a positive number for the angles in which the corresponding current beam pattern does not meet a preset condition, and output the adjusted secondary weight function to the data calculation unit, wherein the numerical calculation unit is further configured to:

each time after data which makes the difference value minimum for an array element is determined, update the main weight function based on the determined data;

implement the step of determining data again based on the updated secondary weight function output from the secondary weight function adjusting unit; and send the determined data to the beamforming vector generating unit after receiving the judging result of the condition being met.

17. The beamforming apparatus according to claim 16, wherein the main weight function is initialed and updated as $$P_1(\theta) = \frac{1}{G(\theta)} \text{ or } P_1(\theta) = \frac{|G(\theta) - S(\theta)|}{G(\theta)},$$

wherein $P_1(\theta)$ indicates the main weight function, $\theta$ indicates direction angle, $G(\theta)$ indicates the current beam pattern, and $S(\theta)$ indicates the goal beam pattern;

wherein the secondary weight function is initialized as $P_2(\theta)=1$, wherein $P_2(\theta)$ indicates the secondary weight function; and wherein the following equation is used to calculate the difference value between the current beam pattern and the goal beam pattern: $f(w,\phi)=\int_0^\pi (G(\theta)-S(\theta))^2 \cdot P_1(\theta) \cdot P_2(\theta) \cdot d\theta$ or $$f(w, \phi) = \frac{\sqrt{\int_0^\pi G(\theta)^2 \cdot P_1(\theta) \cdot P_2(\theta) \cdot d\theta \cdot \int_0^\pi S(\theta)^2 \cdot P_1(\theta) \cdot P_2(\theta) \cdot d\theta}}{\int_0^\pi G(\theta) \cdot S(\theta) \cdot P_1(\theta) \cdot P_2(\theta) \cdot d\theta},$$

wherein $f(w,\phi)$ indicates the difference value, w indicates amplitudes of the array elements and $\phi$ indicates phases of the array elements.

18. The beamforming apparatus according to claim 10, wherein the input receiving unit is further configured to establish a goal beam pattern based on an optimism object if the optimism object does not include the goal beam pattern.

* * * * *